(12) United States Patent
Godwin

(10) Patent No.: US 6,310,655 B1
(45) Date of Patent: *Oct. 30, 2001

(54) METHOD AND DEVICE FOR DISPLAYING WIDESCREEN IMAGES ON CONVENTIONAL ASPECT RATIO DISPLAY MONITORS

(75) Inventor: John P. Godwin, Los Angeles, CA (US)

(73) Assignee: Hughes Electronics Corporation, El Segundo, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/629,663

(22) Filed: Apr. 9, 1996

(51) Int. Cl.[7] ........................................................ H04N 5/44
(52) U.S. Cl. .......................... 348/564; 348/567; 348/564; 348/555; 348/556; 348/445; 348/715; 348/716
(58) Field of Search ..................................... 348/567, 564, 348/555, 556, 445, 715, 716, 569, 385; H04N 5/445, 5/50

(56) References Cited

U.S. PATENT DOCUMENTS

| | | | |
|---|---|---|---|
| 5,382,972 | 1/1995 | Kannes | 348/15 |
| 5,420,643 | * 5/1995 | Romesburg et al. | 348/561 |
| 5,537,153 | * 7/1996 | Shigihara | 348/564 |
| 5,633,683 | 5/1997 | Rosengren et al. | 348/385 |
| 5,847,703 | * 12/1998 | Teicher et al. | 348/327 |

FOREIGN PATENT DOCUMENTS

| | | |
|---|---|---|
| 0 598 576 A2 | 5/1994 | (EP) . |
| 2-65575 | 3/1990 | (JP) . |
| 3-167975 | 7/1991 | (JP) . |
| 7-99617 | 9/1993 | (JP) . |
| 5-347735 | 12/1993 | (JP) . |
| 6-78235 | 3/1994 | (JP) . |
| 6-86186 | 3/1994 | (JP) . |
| 6-205324 | 7/1994 | (JP) . |
| 6-292148 | 10/1994 | (JP) . |

* cited by examiner

Primary Examiner—Howard Britton
Assistant Examiner—Nhon T. Diep
(74) Attorney, Agent, or Firm—John A. Crook; Michael W. Sales

(57) ABSTRACT

A method and device is described herein for displaying a television picture comprised of several standard aspect ratio images on widescreen and standard aspect ratio video monitors. A widescreen image including several smaller aspect ratio images are assembled and broadcast. A receiver with a widescreen monitor display can display the entire widescreen image. A receiver with a conventional aspect ratio monitor display can display a combination of the smaller aspect ratio images. The device includes a frame store for storing image information, image configuration logic for determining a configuration of image information, and frame address logic to write image information to frame store with a configuration according to image configuration logic.

15 Claims, 3 Drawing Sheets

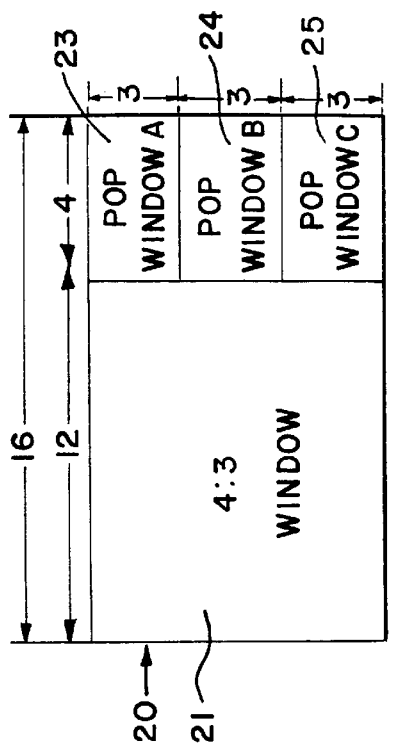
FIG. 3a
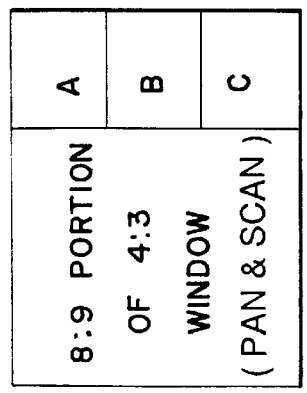
FIG. 3b
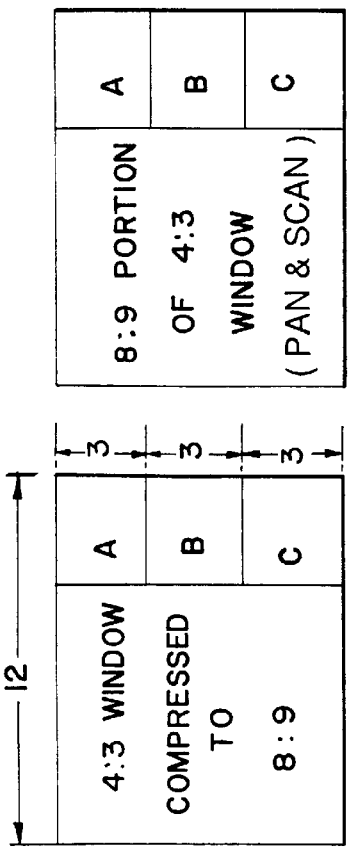
FIG. 3c
FIG. 3d
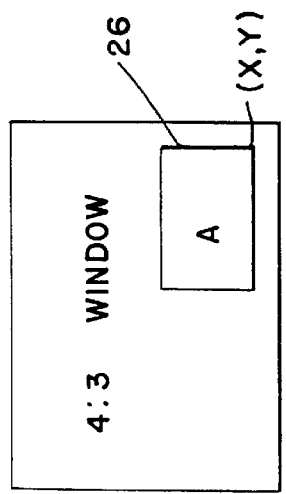
FIG. 3e

METHOD AND DEVICE FOR DISPLAYING WIDESCREEN IMAGES ON CONVENTIONAL ASPECT RATIO DISPLAY MONITORS

BACKGROUND OF THE INVENTION

The present invention relates in general to the display of television pictures. More particularly, the invention relates to the display of a widescreen video image on widescreen and standard aspect ratio video monitors.

Color television pictures are broadcast in the United States according to the National Television System Committee (NTSC) composite standards. A television picture broadcast under the NTSC standard has an width-to-height or aspect ratio of 4:3. Visual information, however, is more often predominant in the horizontal direction than the standard 4:3 aspect ratio. The human eye also has a natural field of view that is significantly greater in the horizontal direction than the 4:3 aspect ratio.

To accommodate the natural characteristics of visual information and human vision, visual information has often been recorded and displayed in widescreen formats greater than 4:3. Motion pictures are commonly recorded in a 1.85:1 aspect ratio format. The Society of Motion Picture and Television Engineers favors a 16:9 aspect ratio as the standard for broadcast television. A 5:3 aspect ratio has also been proposed for broadcast television.

A primary issue with new widescreen aspect ratios is the compatibility of widescreen images with the millions of standard 4:3 aspect ratio televisions currently in use. A 16:9 widescreen image is 33.3% larger than a standard 4:3 image of the same vertical height. Widescreen motion pictures have been shown on broadcast television in a "letter box" to allow display of the entire image on a standard display monitor. The letter boxing of movies, however, has not been widely practiced because of mixed audience reception.

A more common method of achieving compatibility between widescreen and conventional pictures involves displaying only a 4:3 portion of the widescreen picture. A standard monitor thus displays a 4:3 "window" of the larger widescreen image. The widescreen image outside the 4:3 window, however, is not displayed. Thus, one approach to achieving compatibility involves broadcasting two television signals, one signal for widescreen televisions and a signal containing a 4:3 portion of the widescreen image for standard screens. The appropriate signal is chosen by the television receiver. Broadcasting two television signals, however, inefficiently consumes valuable transmission bandwidth. Another approach squeezes the widescreen image into the standard screen format. A 16:9 widescreen image is thus compressed into a 4:3 standard display. Compressing the widescreen image into the standard display, however, significantly distorts the image in the form of a lateral compression of the image.

Widescreen formats are also limited by available widescreen source material. Television programming today is ordinarily produced in the standard 4:3 format. As a result, many programs are not suitable for broadcast as a widescreen picture. Though conversion to a widescreen aspect ratio format is possible, the widescreen format is best utilized with widescreen source material.

Accordingly, there is a need for better utilization of widescreen aspect ratio images with standard aspect ratio display monitors.

SUMMARY OF THE INVENTION

The present invention utilizes a 16:9 widescreen aspect ratio image to show several standard 4:3 aspect ratio images. Preferably, four different 4:3 images are combined into a 16:9 composite widescreen image. The 16:9 composite image includes a primary 4:3 image which fills the entire height of the 16:9 display. Three smaller 4:3 images or picture-out-of-picture (POP) windows fill the remaining 16:9 image. An audio channel and a supplemental data channel may also be assembled for each window.

The video receiver/decoder or integrated receiver/decoder (IRD) which receives and displays the images preferably includes a frame store array, frame address logic, and image configuration logic to determine the display of primary 4:3 and POP images. The image configuration logic preferably determines the video image configuration to be displayed according to the aspect ratio of the display monitor, interactive user input, broadcaster selection, or from a viewer profile. Frame address logic determines the location in the frame store array which image information is written to according to the desired video image configuration determined by the image configuration logic. The video image stored in the frame store array is then read-out to a decoder/digital-to-analog converter (decoder/DAC) for output to a display monitor. The display monitor is preferably a 16:9 or 4:3 aspect ratio display monitor.

The IRD displays a configuration of images based primarily on the aspect ratio of the display monitor. For example, a 16:9 widescreen aspect ratio display monitor and widescreen receiver is capable of displaying all four 4:3 images which make up the 16:9 composite image.

With a 4:3 aspect ratio display monitor, the images may be displayed in several different configurations. A first image configuration displays the entire primary 4:3 image, the three 4:3 POP windows or portions of these images utilizing pan-and-scan techniques. A second image configuration utilizes a 4:3 monitor with a receiver configured to output a 16:9 image to display the entire 16:9 composite image compressed into the 4:3 display. A third image configuration displays only portions of the 16:9 composite image. For example, the three smaller POP 4:3 images are in a 4:9 window portion of the 4:3 monitor. An 8:9 portion of the primary 4:3 image may be displayed on the remaining portion of the 4:3 monitor. The 8:9 window may be a pan-and-scan portion of the primary 4:3 image. In addition, the viewer may interactively control the 8:9 pan-and-scan window.

A fourth image configuration with a 4:3 aspect ratio monitor displays the entire primary 4:3 image with one of the three 4:3 POP windows displayed in a picture-in-picture (PIP) window. The POP window to be displayed in the PIP window may be selected according to several different criteria such as the broadcaster selection, viewer selection, or a viewer profile.

The present invention utilizes widescreen aspect ratio images while maintaining compatibility with conventional aspect ratio equipment. Broadcasters may use programming produced with conventional aspect ratio equipment and combine the conventional size images into a widescreen image. Moreover, users of conventional aspect ratio equipment can also view portions of the widescreen image and experience the benefits of the widescreen image.

It is to be understood that both the foregoing general description and the following detailed description are exemplary and explanatory and are intended to provide further explanation of the invention as claimed. The invention, together with further intended advantages, will best be understood by reference to the following detailed description, taken in conjunction with the accompanying drawings.

BRIEF DESCRIPTION OF THE DRAWINGS

FIGS. 3a–3e are diagrams of the several image display configurations possible with the device of FIG. 2.

DETAILED DESCRIPTION OF THE DRAWINGS

The described embodiment illustrates a digital satellite delivery system. The present invention, however, can be implemented on analog and terrestrial delivery systems.

Figure 1:
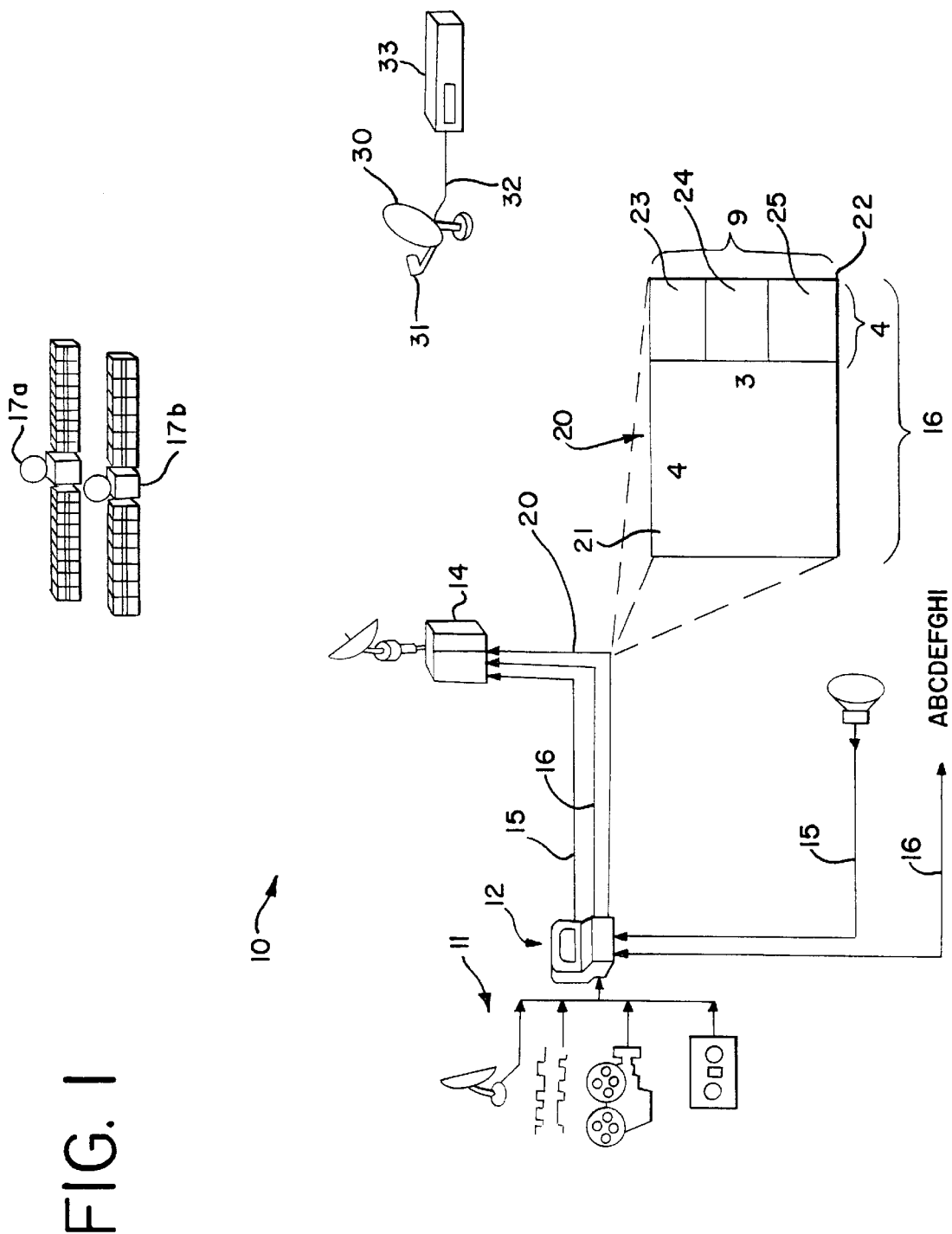
FIG. 1 is a diagram of a satellite television system capable of implementing the present invention.

FIG. 1 illustrates a direct broadcast satellite (DBS) television broadcast system 10 capable of implementing the present invention. A programming production group 12 combines different video sources 11 from live cameras, incoming satellite, terrestrial fiber optic, and prerecorded taped material. The video sources 11 are combined using conventional techniques into a 16:9 composite widescreen image 20. The term "composite" is used in this application to describe a multi-image display as shown in FIGS. 3a to 3e. This use of the term "composite" should be contrasted with other uses wherein "composite" is used to refer the various components (e.g., luminance, chrominance, synchronization, color burst, etc.) that make up a single conventional NTSC color video signal.

For example, video images from different sources are assembled so that a primary 4:3 aspect ratio image 21 is displayed in the full height of a 16:9 widescreen image 20. Because the 4:3 image 21 does not extend the entire width of the 16:9 image 20, a 4:9 portion 22 of the 16:9 image is unused. In the 4:9 portion 22, the production group arranges or stacks three smaller 4:3 images 23, 24, 25 using conventional techniques. The three smaller 4:3 images 23, 24, 25 are referred to as picture-out-of-picture (POP) images because they are outside the primary 4:3 image 21. The 4:3 images 21, 23, 24, 25 can then be assembled for broadcast as a single 16:9 image 20.

The production group 12 also assembles an audio channel 15 and supplemental data channel 16 (SDC) for each 4:3 window 21, 23, 24, 25. The audio channel 15 carries audio information for each window. The SDC 16 preferably carries information which identifies or relates to the contents of the window. The SDC 16 may also carry additional viewer information such as text or data. For example, the SDC 16 may carry system information identifying each window, the time the associated text was created, and the size and position of the window. The SDC 16 may also carry unrelated information such as general news or system technical data.

The composite 16:9 video image 20, the audio channels 15, and the SDC 16 are digitally encoded and transmitted to the Uplink Signal Processing System (USPS) 14. The USPS 14 compresses, encrypts, and multiplexes the video signal with other video channels and control data. The digital video image 20 is preferably compressed into a 3.5–7.5 Mbps data stream using a MPEG compression scheme. Depending on the video content, the MPEG compression allows a possible 36:1 to 70:1 data compression. Of course, other video data rates or data compression schemes may be utilized.

The compressed video signal is also encrypted to prevent unauthorized access to the signal. Audio signals 15 are similarly compressed, but not ordinarily encrypted. The processed video and audio data streams, are multiplexed along with a number of other video channels and network control data.

The USPS 14 modulates the multiplexed data stream onto an intermediate frequency (IF) carrier. The modulated carrier is then upconverted in frequency to an assigned uplink frequency band, preferably between 17.3 to 17.8 GHz. The signals are uplinked to satellites 17a, 17b.

The satellites 17a, 17b are ordinarily geostationary satellites such as a Hughes® HS-601™ spacecraft. The satellites are preferably multiple geostationary satellites located in very close geostationary orbits. Each satellite preferably receives the one of the uplinked carrier signals and converts the signal to an assigned downlink frequency band, preferably between 12.2 to 12.7 GHz. Note the assigned uplink and downlink frequencies may vary for each particular satellite system.

The downlinked signals are captured by antenna 30 and focused to a feed 31. The feed 31 converts the focused signals to an electrical signal which is amplified and down-converted in frequency by a low noise block (LNB) (not shown). The LNB down-converts the signals to IF carrier frequencies, preferably between 950 MHz to 1450 MHz. The amplified and down-converted signals are transmitted via coaxial cable 32 to a receiver and video decoder. Preferably, the receiver and video decoder are integrated into a single device, the integrated receiver decoder (IRD) 33. The IRD 33 is preferably connected to a 16:9 or 4:3 aspect ratio display monitor 44.

Figure 2:
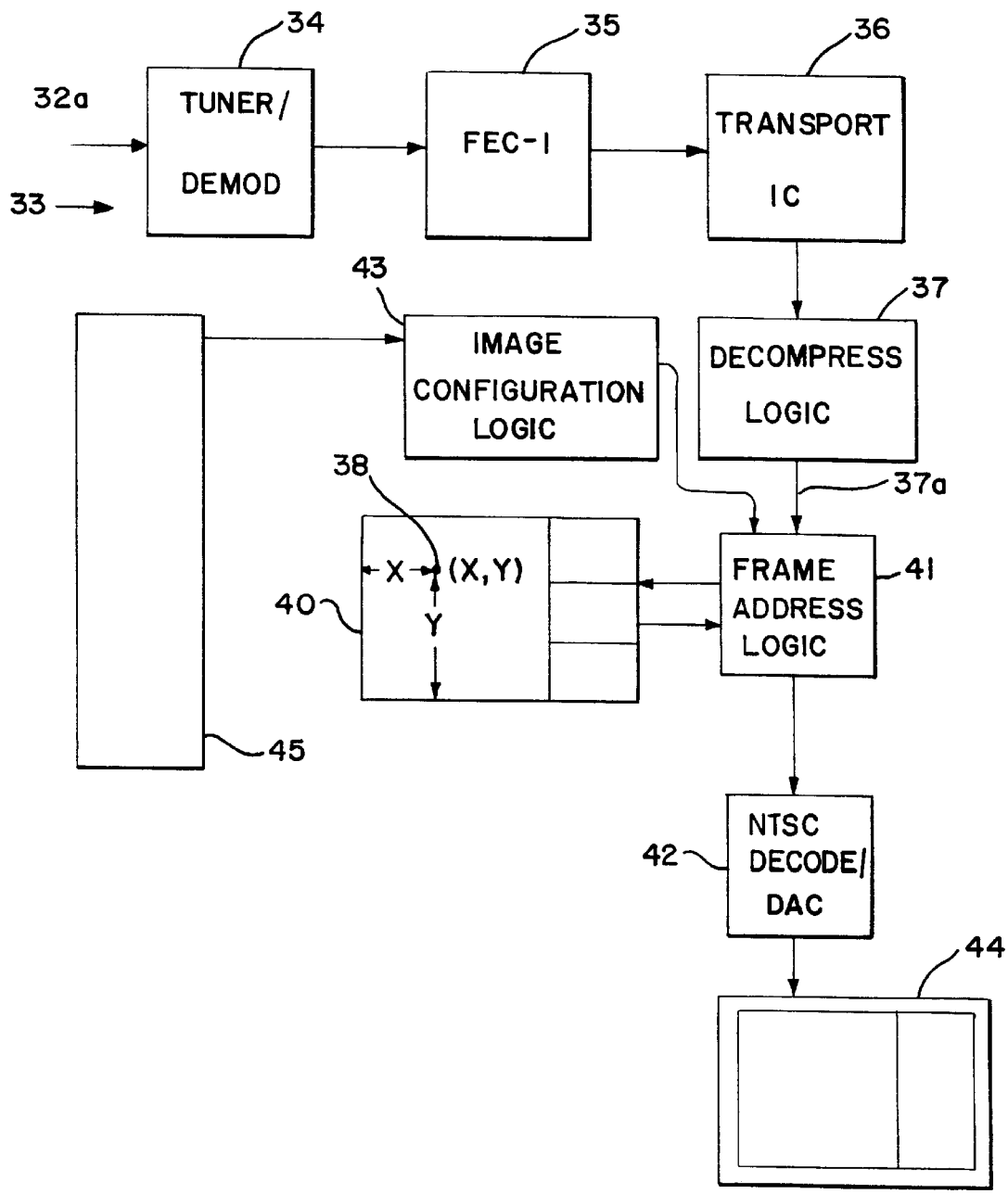
FIG. 2 is a block diagram of an integrated receiver decoder implementing the present invention.

As seen in FIG. 2, the IRD 33 preferably includes a tuner/demodulator 34, inverse forward-error-correction logic 35 ($FEC^{-1}$), transport logic 36 and decompression logic 37. Tuner/demodulator 34 tunes to a carrier signal 32a within the 950 to 1450 MHz frequency range. The selected carrier signal is then demodulated into a digital data stream. Inverse forward error-correction ($FEC^{-1}$) logic 35 using circuitry or software is provided to apply the FEC bits to correct transmission bit errors, as is well known in the art. After the $FEC^{-1}$ 35 is performed, the transport logic 36 decrypts the video signal. After decryption by the transport logic 36, the compressed video signal is recovered. Decompression logic 37 then decompresses the compressed video signal to recover the digital video signal 37a.

The described logic may be implemented with conventional logic devices as are well known in the art. For example, a microprocessor with random access memory (RAM) and read-only memory (ROM), discrete logic devices (e.g., AND, OR, NAND and NOR gates), field programmable gate array (FPGA), or application specific integrated circuits (ASICs) may be used to implement the logic.

The IRD 33 further includes frame store array 40, frame address logic 41, decoder/digital-to-analog converter (decoder/DAC) 42, and image configuration logic 43. The digital video signal is preferably written to a two-dimensional digital memory array or frame store array 40 of picture element (pixel) values.

Each pixel 38 represents the video image at a spatial location corresponding to the pixel's vertical and horizontal image location and associated address in the memory array. The horizontal array location (x) corresponds to the picture width and the vertical location (y) corresponds to the picture height.

The frame store 40 preferably includes static or dynamic RAM (SRAM or DRAM). Alternatively other types of fast read-write memory storage devices may be used (e.g., flash RAM or similar device, etc.).

The frame store 40 is continuously updated with digital video data to redraw the picture 30 times each second. A television picture is ordinarily scanned onto a screen as a sequence of laterally painted horizontal lines. The horizontal line painting the video image rasters across the screen, varying in intensity according to the pixel value at that location. Under the NTSC standard, for example, a sequence of 480 visible horizontal lines followed by an interval of 45 lines without picture information constitutes one complete picture or frame. Movement of the television picture is created by rapidly drawing each of these frames onto the screen 30 times each second.

The frame address logic 41 controls the vertical and horizontal location (x,y) within the frame store 40 from which digital video data is written to or read from. The frame address logic 41 also selects the frame store pixel locations (x,y) which are read-out to the decoder/DAC 42. Preferably, the decoder/DAC 42 translates the digital pixel values into a signal for output to a display monitor 44.

The display monitor 44 is preferably either a standard 4:3 aspect ratio monitor or a widescreen 16:9 aspect ratio monitor. Decoder/DAC 42 preferably converts the digital video data from the frame store 40 to the appropriate NTSC signal, as is well known in the art. It should be understood that those skilled in the art may provide a decoder which generates a signal suitable for other television standards such as, for example, phase alternating line (PAL) systems. Alternatively, the digital video image could be digitally displayed without the analog raster scan implementation.

Image configuration logic 43 determines the configuration of images to be displayed based on the aspect ratio of the display monitor 44, broadcaster selection, viewer selection or a viewer profile. The desired image configuration is sent to the frame address logic 41. The frame address logic 41 controls the display of the 16:9 image or the various 4:3 image formats. Several examples of different display configurations are now given.

FIG. 3a represents the display of a 16:9 composite image 20 on a 16:9 aspect ratio display monitor. With a 16:9 widescreen display monitor, the primary 4:3 image 21 can be displayed along with the three 4:3 POP images 23, 24, 25. For example, the primary 4:3 window 21 can show a sporting event such as a professional football game. The POP windows 23, 24, 25 may show isolation shots of key players (e.g., quarterback, wide receiver, and linebacker) from different on-site cameras. The SDC 16 (FIG. 1) may carry text identifying the player and his or her key statistics or supply different game statistic (i.e., down and yardage, timeouts remaining, etc.). Alternatively, the programming group may provide completely unrelated programming or even advertising in the POP windows 23, 24, 25.

To display the 16:9 image on a 16:9 monitor, the frame address logic 41 (FIG. 2) writes each pixel of the composite 16:9 digital image 20 directly to a 16:9 portion of the frame store 40. The frame address logic 41 then reads-out the pixel values stored in the frame store array 40 to the decoder/DAC 42. The decoder/DAC 42 outputs a video signal to the display monitor according to the desired analog or digital format.

FIGS. 3b–3e represent several possible configurations of 16:9 composite widescreen images displayed on a 4:3 aspect ratio monitor.

As represented by FIG. 3b, an IRD with a standard 4:3 monitor can display the full 4:3 image 21 (FIG. 3a) without the three smaller 4:3 POP images 23, 24, 25. To display the primary 4:3 image 21 of a 16:9 composite image 20 on a 4:3 monitor, the frame address logic 41 (FIG. 2) writes pixel values of the primary 4:3 image to the frame store 40. Accordingly, frame address logic 41 is programmed to read-out the pixel values of the 4:3 image stored in the frame store 40 to the decoder/DAC 42 for output to the display monitor 44.

As represented by FIG. 3c, the IRD can also be configured to output a 16:9 image compressed onto a standard 4:3 monitor using conventional techniques. The main 4:3 image 21 (FIG. 3a) and the POP windows 23, 24, 25 can thus all be displayed. The 16:9 image, however, will be distorted in the form of a lateral compression of the image.

As represented by FIG. 3d, three POP images 23, 24, 25 (FIG. 3a) and a 8:9 portion of the primary 4:3 image can also be displayed on a 4:3 monitor. The frame address logic 41 (FIG. 2) writes the pixel values of the three POP images 23, 24, 25 (FIG. 3a) to a 4:9 portion of the frame store 40 (FIG. 2). An 8:9 portion of the 4:3 image is written to the remaining 8:9 portion of the frame store 40. The 8:9 window may be a conventional broadcaster controlled pan-and-scan portion of the 4:3 window. The 8:9 section of the 4:3 window is thus displayed according to the broadcaster's selection. Alternatively, the 8:9 window may also be an interactive viewer controlled 8:9 pan-and-scan portion of the 4:3 window. Preferably, the viewer controls the pan-and-scan window through a wireless remote control 45 that is also used to control other IRD parameters (e.g., channel selection, volume, etc) through an infrared link, as is well known in the art. A keypad may also be provided to allow the control of the parameters at the IRD unit.

The viewer may thus control the display of the 8:9 window. With viewer controlled pan-and-scan, the image configuration logic 43 takes input from the viewer and informs the frame address logic 41 of the 8:9 section of the 4:3 image selected by the user. Accordingly, the frame address logic 41 writes the pixel values of the appropriate 8:9 image to the frame store 40. The frame address logic 41 then reads the contents of the frame store 40 to the decoder/DAC 42 for conversion and output to the display monitor 44.

As represented by FIG. 3e, the full primary 4:3 image can also be displayed on a 4:3 monitor with one of the POP windows 23, 24, 25 (FIG. 3a) displayed as a picture-in-picture (PIP) image 26 (FIG. 3e). The POP image to be displayed in the PIP window 26 is determined by the image configuration logic 43 (FIG. 2) according to the interactive user input, the broadcast selection, or viewer profile logic. For example, the user may select the display of the PIP window through the remote control 45 or keypad of the IRD. Alternatively, the broadcaster may chose the PIP image by programming and broadcasting the image to be displayed. In addition, a viewer profile logic may determine the PIP image based on past viewer selections and keywords present in the SDC.

The image configuration logic 43 determines the desired POP window 23, 23, or 25 (FIG. 3a) to be displayed as a PIP image according to the desired criteria and notifies the frame address logic 41 (FIG. 2) of the appropriate image configuration. The frame address logic 41 then determines the location of the selected POP window by the horizontal/vertical coordinates (x,y) of the POP image location corners within the 16:9 composite image. For a nonrectangular image, the boundaries of the POP image may be used.

Preferably, the image configuration logic 43 (FIG. 2) also determines the location of the PIP window 26 (FIG. 3e) within the 4:3 image and notifies the frame address logic 41 (FIG. 2). The frame address logic 41 determines the addresses (x,y) of the corners of the PIP window 26 within the frame store 40. At the PIP image 26 address locations, the frame address logic 41 writes video information from the selected 4:3 POP image address of the 16:9 composite image. The frame store 40 therefore contains the 4:3 image with the appropriate POP image in a PIP window. The frame address logic 41 reads-out the frame store 40 to the decoder/DAC 42 which outputs the image to the display monitor 44.

As understood by those skilled in the art, conventional PIP techniques such as moving the PIP image to various locations within the 4:3 image or swapping the main image with the PIP image or the main audio with the PIP audio, for example, may also be utilized.

The present invention maximizes the utilization of 16:9 images with 16:9 aspect ratio display monitors and existing 4:3 aspect ratio equipment. Widescreen aspect ratio equipment can utilize widescreen images while standard size receivers can also display portions of the widescreen image without requiring an additional tuner.

Of course, it should be understood that a wide range of changes and modifications can be made to the preferred embodiment described above. For example, images of aspect ratios other than 16:9 or 4:3 may be combined to form composite images which can be shown on different aspect ratio equipment. It is therefore intended that the foregoing detailed description be regarded as illustrative rather than limiting and that it be understood that it is the following claims, including all equivalents, which are intended to define the scope of this invention.

We claim:

1. A system for receiving video programming comprising:
   a receiver station that receives a wide-screen multi-image signal that was transmitted from a remote location;
   the received wide-screen multi-image signal comprising at least first and second images each located in either a non-wide-screen primary image area or at least one non-wide-screen secondary image area, respectively;
   said non-wide-screen primary image area and said non-wide-screen secondary image area received in a picture-out-of-picture (POP) configuration;
   said receiver station comprising a tuner for receiving said wide-screen multi-image signal at a single frequency;
   said receiver station further comprising a decoder in communication with said tuner and programmed to receive said wide-screen multi-image signal in said POP configuration and provide the image in said non-wide-screen primary image area and the image in said non-wide-screen secondary image area to a display in a picture-in-picture (PIP) configuration.

2. The system of claim 1 wherein said display comprises a 4:3 aspect ratio.

3. The system of claim 1 wherein:
   said non-wide-screen primary image area comprises a 4:3 aspect ratio; and
   said non-wide-screen secondary image area comprises a 4:3 aspect ratio.

4. The system for receiving video programming of claim 1, wherein the non-wide-screen primary image area and the non-wide-screen secondary image area are different sizes.

5. The system for receiving video programming of claim 1, wherein the received wide-screen multi-image signal received at the single frequency includes an audio signal associated therewith and wherein the receiver station includes an audio receiver that decodes the audio signal.

6. A system for transmitting video programming to a plurality of receiver stations, the system comprising:
   a video encoder that receives video images from a plurality of sources and assembles said video images into a wide-screen multi-image signal having a 16:9 aspect ratio;
   said wide-screen multi-image signal comprising first and second images located in a non-wide-screen primary image area and at least one non-wide-screen secondary image area, respectively;
   said non-wide-screen secondary image area and said non-wide-screen primary image area of said multi-image signal arranged in a picture-out-of-picture configuration;
   said non-wide-screen primary image area having a 4:3 aspect ratio;
   a transmitter that receives said wide-screen multi-image signal from said video encoder and transmits it over a single frequency to said plurality of receiver stations.

7. The system for transmitting video programming to a plurality of receiver stations of claim 6, wherein the non-wide-screen primary image area and the non-wide-screen secondary image area are different sizes.

8. The system for transmitting video programming to a plurality of receiver stations of claim 6, wherein the video encoder encodes an audio signal associated with the wide-screen multi-image signal and the transmitter transmits the audio signal as associated with the wide-screen multi-image signal to the plurality of receiver stations.

9. A method of receiving video programming comprising the steps of:
   receiving at a single frequency a wide-screen multi-image signal that was transmitted from a remote location;
   said wide-screen multi-image signal comprising at least first and second images each located in either a non-wide-screen primary image area or at least one non-wide-screen secondary image area, respectively;
   said non-wide-screen primary image area and said at least one non-wide-screen secondary image area of said multi-image signal received in a picture-out-of-picture (POP) configuration;
   programming a decoder to receive said wide-screen multi-image signal in said POP configuration and provide the image in said non-wide-screen primary image area and the image in said at least one non-wide-screen secondary image area to a display in a picture-in-picture (PIP) configuration.

10. The method of claim 9 wherein said decoder is further programmed to also provide said wide-screen multi-image signal to said display.

11. The method of claim 10 further comprising the step of:
    providing a selection means in communication with said decoder;
    allowing said selection means to be operated by a viewer to select whether said decoder provides said POP configuration or said PIP configuration to said display.

12. The method of claim 9 wherein said display comprises a 4:3 aspect ratio.

13. The method of claim 9 wherein:
    said non-wide-screen primary image area comprises a 4:3 aspect ratio; and
    said at least one non-wide-screen secondary image area comprises a 4:3 aspect ratio.

14. The method of receiving video programming of claim 9, wherein the non-wide-screen primary image area and the non-wide-screen secondary image area are different sizes.

15. The method of receiving video programming of claim 9, wherein the step of receiving includes the step of receiving an audio signal associated with the wide-screen multi-image signal and including the step of decoding the audio signal.

* * * * *